United States Patent
Kimura et al.

[11] Patent Number: 6,068,777
[45] Date of Patent: May 30, 2000

[54] METHOD OF TREATMENT FOR RENDERING HALOGENATED ORGANIC COMPOUNDS HARMLESS

[75] Inventors: Toshimune Kimura, Musashino; Hiroyuki Ito, Odate, both of Japan

[73] Assignee: Dowa Mining Co., Ltd., Tokyo, Japan

[21] Appl. No.: 09/048,493

[22] Filed: Mar. 26, 1998

[30] Foreign Application Priority Data

Mar. 27, 1997 [JP] Japan ................................. 9-093145

[51] Int. Cl.⁷ .................................................. C02F 1/70
[52] U.S. Cl. ..................... 210/747; 210/757; 210/908; 405/128
[58] Field of Search .................... 210/747, 757, 210/908; 405/128

[56] References Cited

U.S. PATENT DOCUMENTS

| | | | |
|---|---|---|---|
| 5,258,124 | 11/1993 | Bolton et al. | 210/757 |
| 5,362,402 | 11/1994 | Haitko et al. | 210/757 |
| 5,447,639 | 9/1995 | Sivavec | 210/747 |
| 5,575,927 | 11/1996 | Sivavec et al. | 210/757 |
| 5,750,036 | 5/1998 | Sivavec | 210/747 |
| 5,833,388 | 11/1998 | Edwards et al. | 405/128 |
| 5,868,941 | 2/1999 | Gillham et al. | 210/747 |

FOREIGN PATENT DOCUMENTS 8-89975  4/1996  Japan.

*Primary Examiner*—David A. Simmons
*Assistant Examiner*—Betsey J. Morrison
*Attorney, Agent, or Firm*—Frishauf, Holtz, Goodman, Langer & Chick, P.C.

[57] ABSTRACT

The reduction of halogenated organic compounds with an iron powder can be markedly accelerated to realize an enhanced reaction rate by the combined use of a reducing substance that is water-soluble and which exhibits weak acidity in water. The reducing substance such as sodium hydrogensulfite may be injected into the ground simultaneously with the iron powder or it may be preliminarily added to the contamination source via a different route than the iron powder which is subsequently injected. An amount of water containing 100 ppm of trichloroethylene (TCE) as a halogenated organic compound was provide; 500 ppm of sodium hydrogensulfite was added and 6,000 ppm of an iron powder was subsequently added; the time profile of the TCE concentration in the mixture was measured; as shown in FIG. 1, the TCE concentration decreased rapidly with the lapse of time and more than 90% of TCE was reduced in 8 days.

18 Claims, 4 Drawing Sheets

Time profile of TCE concentration

1: Fe = 6000 ppm, NaHSO₃ = no addition
2: Fe = 12000 ppm, NaHSO₃ = no addition
3: Fe = 6000 ppm, NaHSO₃ = 500 ppm
4: Fe = 12000 ppm, NaHSO₃ = 500 ppm Time profile of TCE concentration 1: Fe = 6000 ppm, NaHSO₃ = no addition
2: Fe = 12000 ppm, NaHSO₃ = no addition
3: Fe = 6000 ppm, NaHSO₃ = 500 ppm
4: Fe = 12000 ppm, NaHSO₃ = 500 ppm

6,068,777

METHOD OF TREATMENT FOR RENDERING HALOGENATED ORGANIC COMPOUNDS HARMLESS

BACKGROUND OF THE INVENTION

1. Field of the Invention

This invention relates to a method of cleaning up contaminated soil and groundwater. More specifically, the invention relates to a method by which soil and groundwater that are contaminated with halogenated organic compounds are cleaned up by using an iron powder in combination with a reducing substance that is water-soluble and which exhibits weak acidity in water.

2. Description of the Prior Art

Soil and groundwater that are contaminated with halogenated organic compounds are conventionally cleaned up by a soil vapor evacuation (SVE) method utilizing the volatility of the contaminant or by a pump and treat (P&T) method. In these methods, the gas component of the soil or the groundwater itself is lifted to the ground level before the contaminant is treated. Therefore, a sufficient land space to treat the contaminant and treating facilities are necessary and a substantial initial investment is unavoidable for meeting this requirement. In addition, transporting the contaminant to the treating facilities on the ground level requires special means and operating cost. What is more, the effectiveness of the treatment is highly sensitive to the type of contamination, the site of contamination and its terrain.

To deal with these problems, several methods have been proposed for treating contaminants as they are kept in place. Two of such approaches are described in Japanese Patent Application Nos. 93138/1995 and 248872/1996 and based on the principle of cleaning up contaminated groundwater by establishing contact with an iron powder layer placed under the ground. These methods are effective in that they are capable of collectively removing heavy metals and halogenated organic compounds in the groundwater using an iron powder. However, the methods have had the problem that if the iron powder is used independently, the reaction rate is not fast enough to clean up the contamination within a short duration of time.

Thus, the conventional methods involving the contact of contaminants with an underground iron powder layer are an effective way to clean up the contamination at low cost as the contaminants are kept in place but, on the other hand, the reaction rate must be increased in order to complete the clean-up operation within a limited time.

SUMMARY OF THE INVENTION

The present invention has been accomplished under these circumstances and has as an object providing a method of cleaning up soil and groundwater that are contaminated with halogenated organic compounds. The method is an improvement of the conventional method of in situ remediation with an iron powder and is capable of rapidly treating the halogenated organic compounds as they are mostly kept in place. It should, however, be noted that practice of the invention in such a manner that the halogenated organic compounds are not kept in place is by no means excluded from the scope of the invention.

The present inventors conducted intensive studies in order to solve the aforementioned problems of the prior art. As a result, they found that the rate of reaction between an iron powder and a halogenated organic compound could be increased by using the iron powder in combination with reducing substances such as sodium hydrogensulfite that were water-soluble and which exhibited weak acidity in water.

Thus, the present invention provides a method of cleaning up soil and groundwater such that a layer of dispersed iron particles is formed within the soil contaminated with halogenated organic compounds and brought into contact with the groundwater running through the contaminated soil to thereby render the halogenated organic compounds in the soil and groundwater harmless, characterized in that a reducing substance that is water-soluble and which exhibits weak acidity in water is dusted into the soil together with the iron powder.

DETAILED DESCRIPTION OF THE INVENTION

Figure 1:
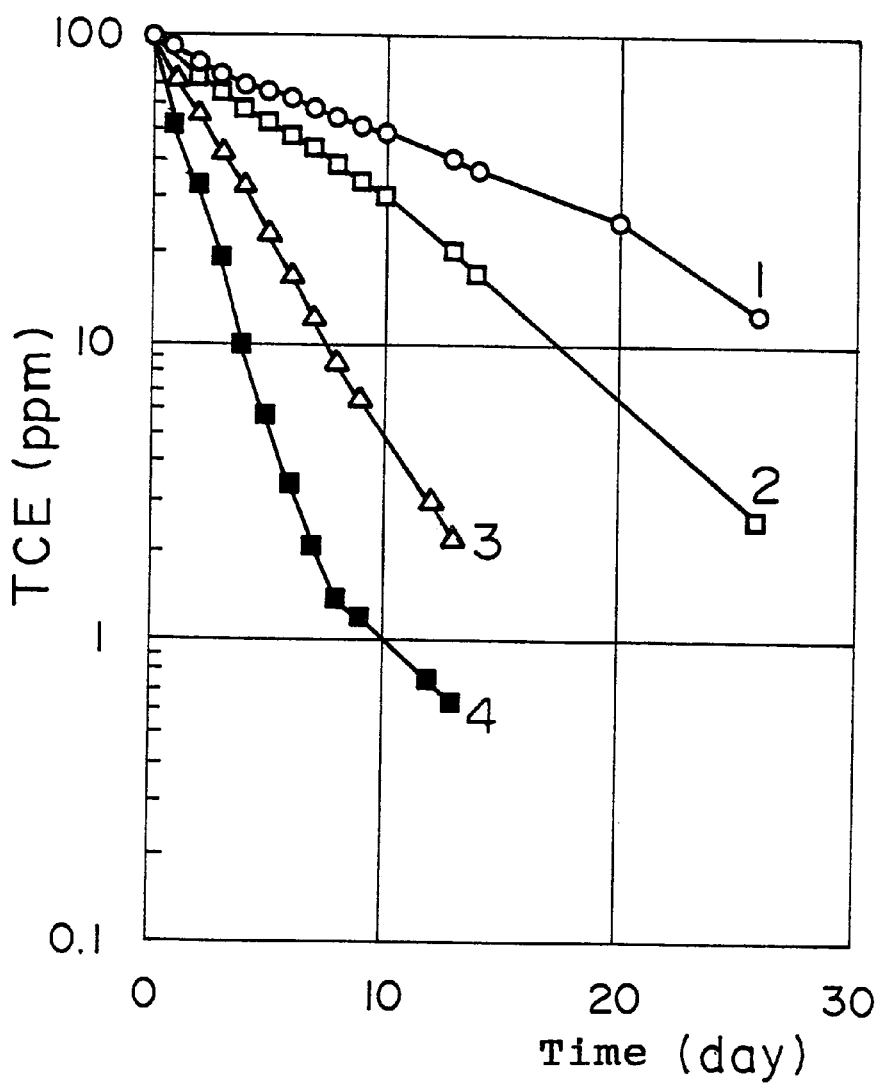
FIG. 1 is a graph showing the time profiles of the trichloroethylene concentration in Example 1 and the Comparative Example.

The halogenated organic compound as the contaminant in the soil and groundwater which are to be cleaned up by the method of the invention is at least one member of the group consisting of trichloroethylene, tetrachloroethylene, dichloroethylene isomers inclusive of cis-1,2-dichloroethylene, trans-1,2-dichloroethylene and 1,1-dichloroethylene, 1,1,2,2-tetrachloroethylene, carbon tetrachloride, dichloromethane, 1,1,1-trichloroethane, 1,1,2-trichloroethane and 1,1,2,2-tetrachloroethane.

The reducing substance which is water-soluble and which exhibits weak acidity in water is added in an amount of at least 100 ppm, preferably between 500 and 10,000 ppm, relative to the groundwater to be treated.

Examples of the reducing substance that is water-soluble and which exhibits weak acidity in water include not only the already-mentioned sodium hydrogensulfite but also other compounds such as sodium pyrosulfite ($Na_2S_2O_5$) and sodium dithionite ($Na_2S_2O_4$).

The reason why these reducing substances markedly accelerate the degradation of halogenated organic compounds initiated by upon contact with the iron powder would be as follows. According to the many years of experience in the treatment of effluents, it has been found that the reactivity of iron powders decreases slowly as the surfaces of the iron particles are oxidized. Therefore, continuing to expose new surfaces at all times would be necessary for maintaining the desired reactivity. This also applies to the degradation of halogenated organic compounds. There was conducted an experiment in which the air atmosphere was completely replaced by carbon dioxide in order to prevent the oxidation of the surfaces of iron particles and the result is shown in Reference Example 1, according to which the reaction in the $CO_2$ atmosphere was found to proceed at a faster rate than in the air atmosphere, thus demonstrating the validity of the hypothesis set forth above.

However, considering the circumstances under which the primary object of the invention should be attained, namely, the decomposition of halogenated organic compounds must occur, the reaction site is in a comparatively shallow layer of the soil which forms the ground and it is very difficult to create a condition where the supply of oxygen is completely blocked. One of the most effective alternatives would be by using a reducing agent. If the vicinity of the iron particles can be deoxygenated by introducing a reducing agent that is inexpensive and which will cause no environmental problems, the oxide formed on the surfaces of the iron particles will be sufficiently reduced to accelerate the continued exposing of new surfaces of iron particles. An additional requirement in this case is to control the rate at which the new surfaces form. In other words, no new surfaces should be covered again before the required reaction for the degradation of the contaminant is carried out and new surfaces should not form at an unduly rapid rate. If the former requirement is not met, the reaction will be interfered with; if the latter requirement is not met, a violent reaction will occur to present a safety problem and the iron powder will be consumed so rapidly as to cause an economic disadvantage.

In view of these considerations, the pH after the addition of the reducing substance should not be higher than 7.0 since a ferrous hydroxide precipitate forms under alkaline conditions to cover the freshly developing surfaces of iron particles; under strong acidic conditions, the iron particles will dissolve very quickly while evolving hydrogen gas.

Hence, the present inventors hypothesized that reducing substances which were water-soluble and which would exhibit weak acidity in water would be the most effective for accelerating the reaction of interest and they conducted a series of studies to verify the validity of the postulation. While various inorganic and organic substances were candidates, the inventors thought that only inorganic substances would be practically feasible in view of the purpose of cleaning up the environment and from an economic viewpoint. Organic substances having a reducing capability are not only costly but they are also generally low in effectiveness and must be used in larger amounts than inorganic substances. Even inorganic substances should not relate to nitric acid or phosphoric acid which can potentially cause eutrophication and other problems in the soil. The inventors also anticipated that the pH for the reaction would desirably lie in a weak acidic range (pH≧3.5) where the iron powder will not evolve hydrogen gas or in a range up to a pH of about 8 where ferrous ions released from the newly formed surfaces of iron particles will hardly form a hydroxide precipitate. The inventors selected sodium hydrogensulfite, sodium bisulfite and sodium pyrosulfate as substances that satisfied these conditions; testing of these substances revealed that they produced marked effects in accelerating the reaction as will be demonstrated later in the Examples. However, sodium sulfite was found to be less effective in accelerating the reaction although it was also a reducing agent. This would be because a solution containing sodium sulfite becomes alkaline to form a hydroxide precipitate.

According to the method of the invention, the reducing substance which is water-soluble and which exhibits weak acidity in water, inter alia, sodium hydrogensulfite is used in combination with an iron powder and, as a result, the reduction of halogenated organic compounds by the action of the iron power is markedly accelerated to increase the rate of the reaction.

The reducing substance which is water-soluble and which exhibits weak acidity in water may be injected into the ground together with the iron powder; alternatively, it may be preliminarily added to the contamination source via a different route than the iron powder which is subsequently injected. If the reducing substance which is water-soluble and which exhibits weak acidity in water is added in an amount less than 100 ppm relative to the groundwater to be cleaned up, the effectiveness of using the substance in combination with the iron powder is impractically low. Hence, the addition of the reducing substance is desirably at least 100 ppm. A more desirable range is between 500 and 10,000 ppm. Beyond 500 ppm, the reducing substance will provide an even more marked reaction accelerating effect than when it is added in an amount of 100 ppm; however, if its addition exceeds 10,000 ppm, the chemicals cost necessary to perform the clean-up operation will increase to an inpractically high level.

The following examples are provided for the further purpose of illustrating the present invention but are in no way intended to be limiting.

EXAMPLE 1

An amount of water containing 100 ppm of trichloroethylene (TCE) as a halogenated organic compound was provided. To the water, 500 ppm of sodium hydrogensulfite was added and 6,000–12,000 ppm of an iron powder (E-200 of Dowa Iron Powder Co., Ltd.) was subsequently added; the mixture was sealed in containers, which were then shaken. Samples of gas were taken at given time intervals from the head space at the top of each container and the time profiles of the trichloroethylene concentration were measured. The results are shown in Table 1 and FIG. 1, from which one can see that the trichloroethylene concentration decreased rapidly with the lapse of time; when the addition of the iron powder was 6,000 ppm, the trichloroethylene concentration dropped to less than 10 ppm in 8 days.

TABLE 1

| | TCE Concentration, ppm | |
| --- | --- | --- |
| Days | 6000 ppm of Fe | 12000 ppm of Fe |
| 0 | 100.0 | 100.0 |
| 1 | 72.6 | 52.4 |
| 2 | 56.8 | 33.2 |
| 3 | 43.3 | 19.2 |
| 4 | 33.5 | 9.92 |
| 5 | 23.5 | 5.82 |
| 6 | 17.1 | 3.39 |
| 7 | 12.5 | 2.08 |
| 8 | 8.73 | 1.38 |
| 9 | 6.69 | 1.21 |
| 12 | 3.08 | 0.75 |
| 13 | 2.27 | 0.64 |

Comparative Example

The time profiles of the trichloroethylene concentration were measured under the same conditions as in Example 1, except that sodium hydrogensulfite was not added. The results are shown in Table 2 and FIG. 1, from which one can see that the trichloroethylene concentration decreased steadily with the lapse of time even when the iron powder was used singly in the absence of sodium hydrogensulfite; however, when the addition of the iron powder was 6,000 ppm, it took more than 26 days for the trichloroethylene concentration to drop to less than 10 ppm.

TABLE 2

| | TCE Concentration, ppm | |
| --- | --- | --- |
| Days | 6000 ppm of Fe | 12000 ppm of Fe |
| 0 | 100.0 | 100.0 |
| 1 | 91.8 | 89.1 |
| 2 | 82.6 | 75.8 |

TABLE 2-continued

| | TCE Concentration, ppm | |
|---|---|---|
| Days | 6000 ppm of Fe | 12000 ppm of Fe |
| 3 | 75.8 | 66.1 |
| 4 | 68.9 | 58.5 |
| 5 | 66.5 | 53.3 |
| 6 | 63.0 | 48.5 |
| 7 | 58.4 | 44.1 |
| 8 | 54.5 | 38.5 |
| 9 | 51.5 | 34.5 |
| 10 | 49.8 | 30.8 |
| 13 | 40.3 | 20.4 |
| 14 | 37.7 | 17.5 |
| 20 | 25.2 | |
| 26 | 12.6 | 2.64 |

EXAMPLE 2

Figure 2:
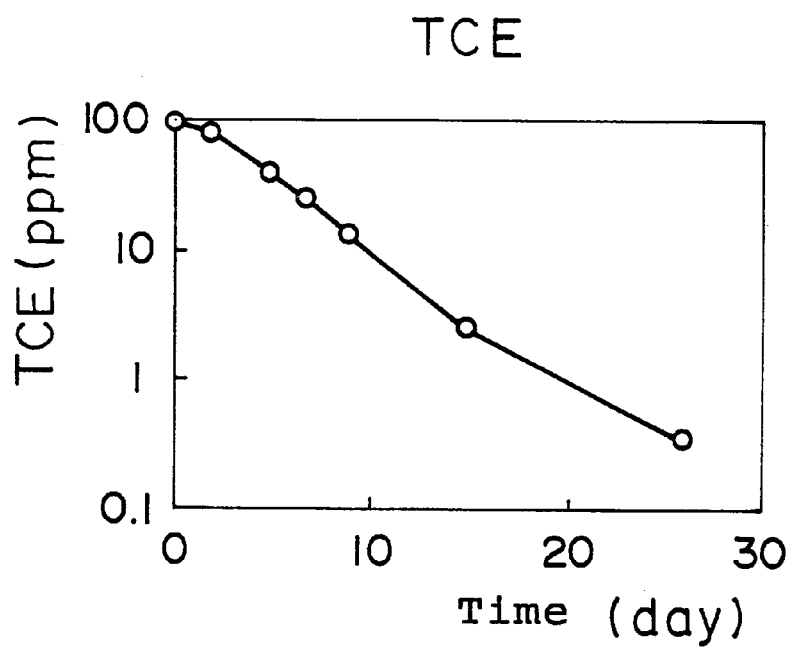
FIG. 2 is a graph showing the time profile of the trichloroethylene concentration in Example 2.

An amount of water containing 100 ppm of trichloroethylene (TCE) as a halogenated organic compound was provided. To the water, 500 ppm of sodium bisulfite ($Na_2S_2O_5$) was added and 6,000 ppm of an iron powder (E-200 of Dowa Iron Powder Co., Ltd.) was subsequently added; the mixture was sealed in a container, which was then shaken. Samples of gas were taken at given time intervals from the head space at the top of the container and the time profile of the trichloroethylene concentration was measured. The result is shown in Table 3 and FIG. 2, from which one can see that the trichloroethylene concentration decreased rapidly with the lapse of time to less than 10 ppm in 10 days.

TABLE 3

| | TCE Concentration, ppm |
|---|---|
| Days | 6000 ppm of Fe |
| 0 | 100.0 |
| 2 | 81.6 |
| 5 | 39.8 |
| 7 | 25.1 |
| 9 | 13.4 |
| 15 | 2.6 |
| 26 | 0.4 |

EXAMPLE 3

Figure 3:
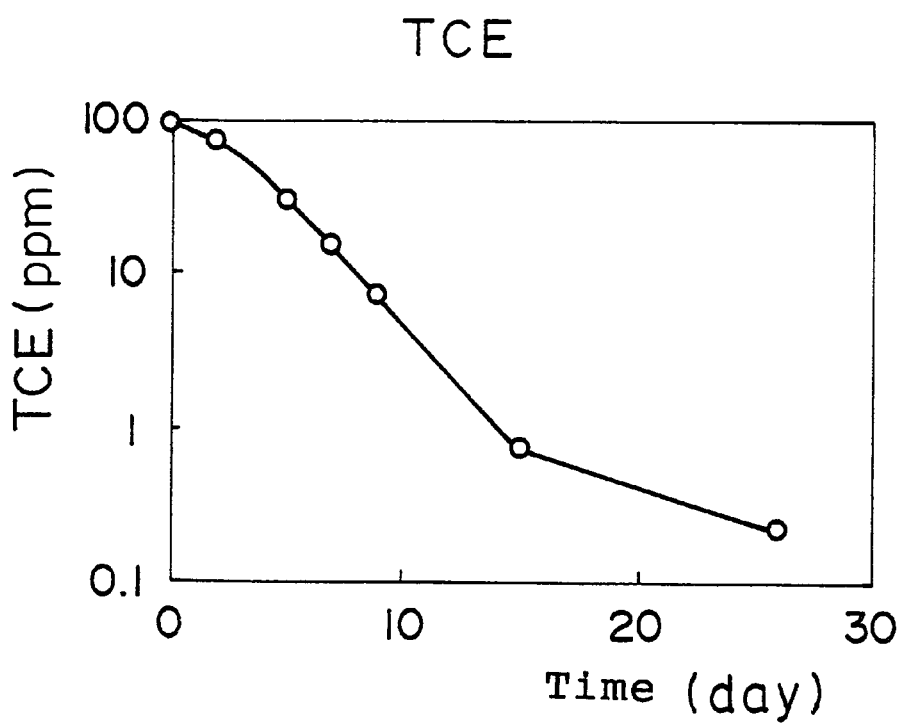
FIG. 3 is a graph showing the time profile of the trichloroethylene concentration in Example 3.

An amount of water containing 100 ppm of trichloroethylene (TCE) as a halogenated organic compound was provided. To the water, 500 ppm of sodium pyrosulfite was added and 6,000 ppm of an iron powder (E-200 of Dowa Iron Powder Co., Ltd.) was subsequently added; the mixture was sealed in a container, which was then shaken. Samples of gas were taken at given time intervals from the head space at the top of the container and the time profile of the trichloroethylene concentration was measured. During the measurement, the pH of the solution was kept between 4.3 and 6.6. The result is shown in Table 4 and FIG. 3, from which one can see that the trichloroethylene concentration decreased rapidly with the lapse of time to less than 10 ppm in 10 days.

TABLE 4

| | TCE Concentration, ppm |
|---|---|
| Days | 6000 ppm of Fe |
| 0 | 100.0 |
| 2 | 73.7 |
| 5 | 30.0 |
| 7 | 15.3 |
| 9 | 7.3 |
| 15 | 0.8 |
| 26 | 0.2 |

EXAMPLE 4

Figure 4:
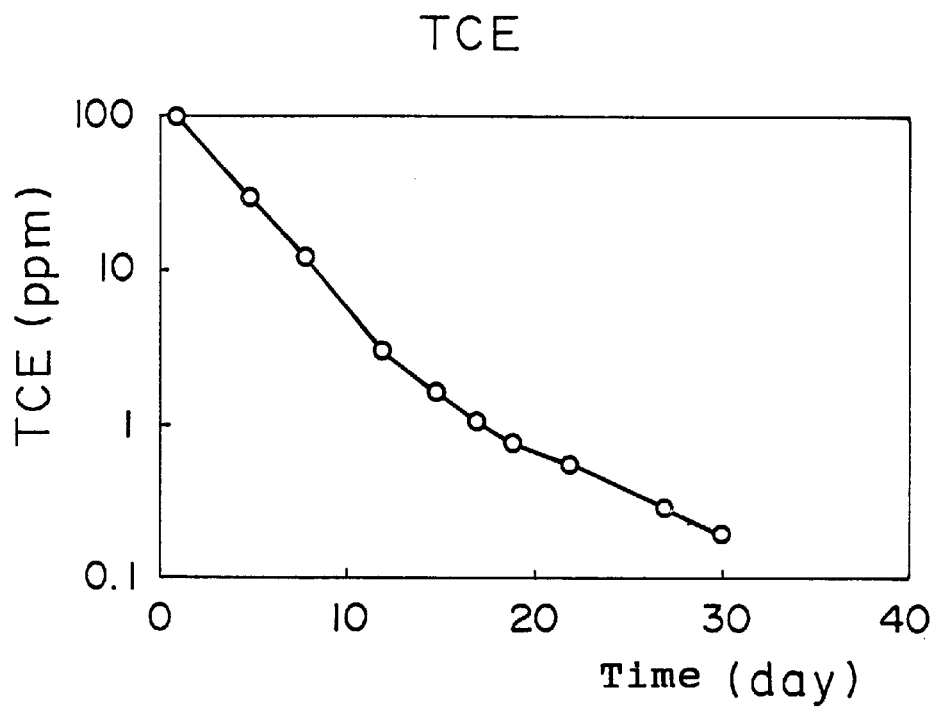
FIG. 4 is a graph showing the time profile of the trichloroethylene concentration in Example 4.

An amount of water containing 100 ppm of trichloroethylene (TCE) as a halogenated organic compound was provided. To the water, 500 ppm of sodium hydrogensulfite ($NaHSO_3$) was added and 6,000 ppm of an iron powder (E-200 of Dowa Iron Powder Co., Ltd.) was subsequently added; the mixture was sealed in a container, which was then shaken. Samples of gas were taken at given time intervals from the head space at the top of the container and the time profile of the trichloroethylene concentration was measured. During the measurement, the pH of the solution was kept between 4.7 and 6.6. The result is shown in Table 5 and FIG. 4, from which one can see that the trichloroethylene concentration decreased rapidly with the lapse of time to less than 10 ppm in 10 days.

TABLE 5

| | TCE Concentration, ppm |
|---|---|
| Days | 6000 ppm of Fe |
| 1 | 100.0 |
| 5 | 28.8 |
| 8 | 12.4 |
| 12 | 3.1 |
| 15 | 1.7 |
| 17 | 1.1 |
| 19 | 0.8 |
| 22 | 0.6 |
| 27 | 0.3 |
| 30 | 0.2 |

Reference Example 1

Figure 5:
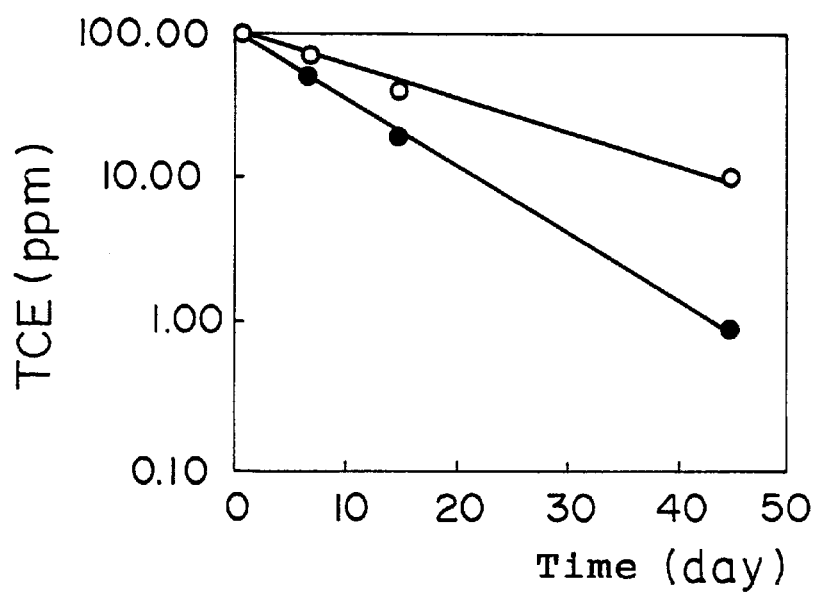
FIG. 5 is a graph showing the time profiles of the trichloroethylene concentration in Reference Example 1.

An amount of water containing 100 ppm of trichloroethylene (TCE) as a halogenated organic compound was provided. To the water, 6,000 ppm of an iron powder (E-200 of Dowa Iron Powder Co., Ltd.) was added and the mixture was sealed into a container together with air and the container was then shaken. Samples of gas were taken at given time intervals from the head space at the top of the container and the time profile of the trichloroethylene concentration was measured. The same experiment was repeated, except that the air in the head-space of the container was replaced by 100% $CO_2$. The results are shown in Table 6 and FIG. 5, from which one can see that the trichloroethylene concentration decreased with the lapse of time and that the reaction rate was markedly increased by $CO_2$ replacement.

TABLE 6

| | TCE Concentration, ppm | |
|---|---|---|
| Days | 6000 ppm of Fe in air | 6000 ppm of Fe in $CO_2$ gas |
| 1 | 100.00 | 100.00 |
| 3 | 81.27 | 80.56 |
| 7 | 64.12 | 50.38 |
| 15 | 37.73 | 18.75 |
| 45 | 10.10 | 0.85 |

Reference Example 2

Figure 6:
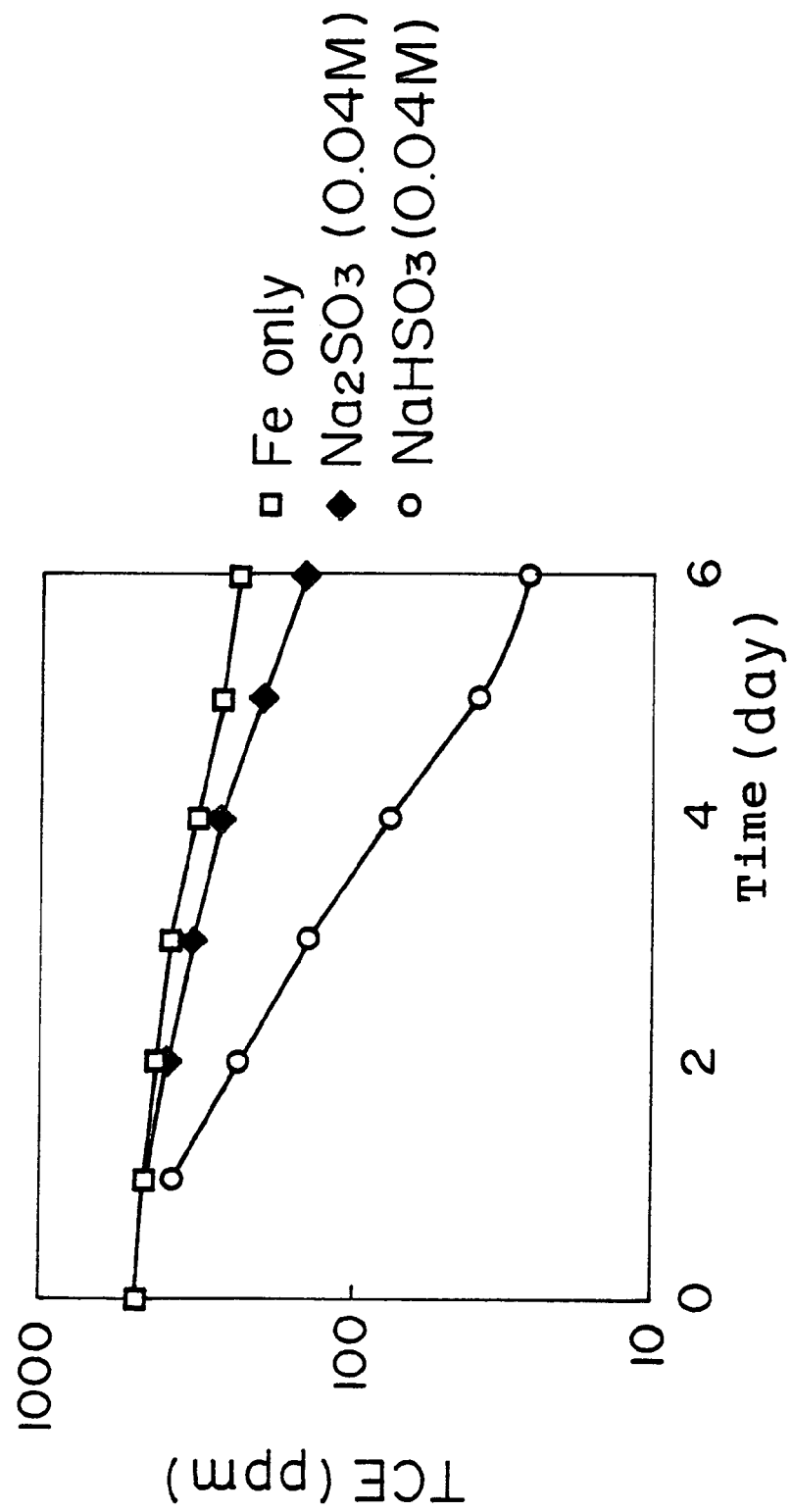
FIG. 6 is a graph showing the time profiles of the trichloroethylene concentration in Reference Example 2.

An amount of water containing 100 ppm of trichloroethylene (TCE) as a halogenated organic compound was provided. To the water, (1) 10,000 ppm of an iron powder alone, (2) 10,000 ppm of an iron powder and 0.04 M of sodium sulfite ($Na_2SO_3$), or (3) 10,000 ppm of an iron powder and 0.04 M of sodium hydrogensulfite ($NaHSO_3$) were added; the mixtures were sealed into containers, which were then shaken. Samples of gas were taken at given time intervals from the head space at the top of each container and the time profiles of the trichloroethylene concentration were measured. The results are shown in Table 7 and FIG. 6, from which one can see that the trichloroethylene concentration decreased with the lapse of time and that the rate of reaction which was small in the sole presence of the iron powder was accelerated a little when sodium sulfite was also added. In contrast, the reaction was markedly accelerated by adding sodium hydrogensulfite together with the iron powder.

TABLE 7

| | TCE Concentration, ppm | | |
|---|---|---|---|
| Days | 10,000 ppm of Fe | 10,000 ppm of Fe + $Na_2SO_3$ (0.04M) pH = 9.3 – 9.2 | 10,000 ppm of Fe + $NaHSO_3$ (0.04M) pH = 4.7 – 6.6 |
| 0 | 500 | 500 | 500 |
| 1 | 464 | 471 | 375 |
| 2 | 424 | 398 | 232 |
| 3 | 381 | 335 | 140 |
| 4 | 302 | 268 | 75.4 |
| 5 | 260 | 196 | 38.4 |
| 6 | 234 | 145 | 26.2 |

In the Comparative Example (using an iron powder alone), it took more than 26 and 14 days to achieve 90% reduction of trichloroethylene when the iron powder was added in amounts of 6,000 ppm and 12,000 ppm, respectively. In Example 1 (using an iron powder in combination with 500 ppm of sodium hydrogensulfite), only 8 and 4 days were necessary in the respective cases. Thus, the method of the invention was effective in markedly increasing the rate at which soil and groundwater that were contaminated with halogenated organic compounds were cleaned up with an iron powder.

What is claimed is:

1. A method of cleaning up soil and groundwater running through the soil that are contaminated by a halogenated organic compound, the method comprising contacting the soil with (i) iron particles such that a layer of dispersed iron particles is formed within the soil and (ii) a reducing substance which is water-soluble, which exhibits weak acidity in water and is an inorganic compound which does not contain nitrogen or phosphorus to thereby render the halogenated organic compound harmless.

2. The method according to claim 1, wherein the halogenated organic compound is at least one member selected from the group consisting of trichloroethylene, tetrachloroethylene, dichloroethylene isomers inclusive of cis-1,2-dichloroethylene, trans-1,2-dichloroethylene and 1,1-dichloroethylene, carbon tetrachloride, dichloromethane, 1,1,1-trichloroethane, 1,1,2-trichloroethane and 1,1,2,2-tetrachloroethane.

3. The method according to claim 2, wherein the reducing substance which is water-soluble and which exhibits weak acidity in water is added in an amount of at least 100 ppm relative to the groundwater to be treated.

4. The method according to claim 2, wherein the pH for the reaction is between 3.5 and 8.

5. The method according to claim 4, wherein reducing substance which is water-soluble and which exhibits weak acidity in water is at least one member selected from the group consisting of sodium hydrogensulfite, sodium dithionite and sodium pyrosulfite.

6. The method according to claim 2, wherein the reducing substance which is water-soluble and which exhibits weak acidity in water is at least one member selected from the group consisting of sodium hydrogensulfite, sodium dithionite and sodium pyrosulfite.

7. The method according to claim 1, wherein the method is carried out at a pH between 3.5 and 8.

8. The method according to claim 7, wherein the reducing substance which is water-soluble and which exhibits weak acidity in water is at least one member selected from the group consisting of sodium hydrogensulfite, sodium dithionite and sodium pyrosulfite.

9. The method according to claim 1, wherein the reducing substance which is water-soluble and which exhibits weak acidity in water is added in an amount between 500 and 10,000 ppm relative to the groundwater to be treated.

10. The method according to claim 9, wherein the reducing substance which is water-soluble and which the exhibits weak acidity in water is at least one member selected from group consisting of sodium hydrogensulfite, sodium dithionite and sodium pyrosulfite.

11. The method according to claim 1, wherein the reducing substance which is water-soluble and which exhibits weak acidity in water is at least one member selected from the group consisting of sodium hydrogensulfite, sodium dithionite and sodium pyrosulfite.

12. The method according to claim 1, wherein the reducing substance is sodium hydrogensulfite.

13. The method according to claim 12, wherein the halogenated organic compound is at least one member selected from the group consisting of trichloroethylene; tetrachloroethylene; dichloroethylene isomers inclusive of cis-1,2-dichloroethylene, trans-1,2-dichloroethylene and 1,1-dichloroethylene; carbon tetrachloride; dichloromethane; 1,1,1-trichloroethane; 1,1,2-trichloroethane and 1,1,2,2-tetrachloroethane.

14. The method according to claim 13, wherein the method is carried out at a pH between 3.5 and 8.

15. The method according to claim 14, wherein the sodium hydrogensulfite is added in an amount of at least 100 ppm relative to the groundwater to be treated.

16. The method according to claim 15, wherein the sodium hydrogensulfite is added in an amount between 500 and 10,000 ppm relative to the groundwater to be treated.

17. The method according to claim 1, wherein the reducing substance is sodium dithionite.

18. The method according to claim 1, wherein the reducing substance is sodium pyrosulfite.

* * * * *